May 10, 1966  J. MINICHELLO ETAL  3,250,377
PACKAGE SORTING SYSTEM AND TRANSFER MECHANISM THEREFOR
Filed Dec. 11, 1963  3 Sheets-Sheet 1
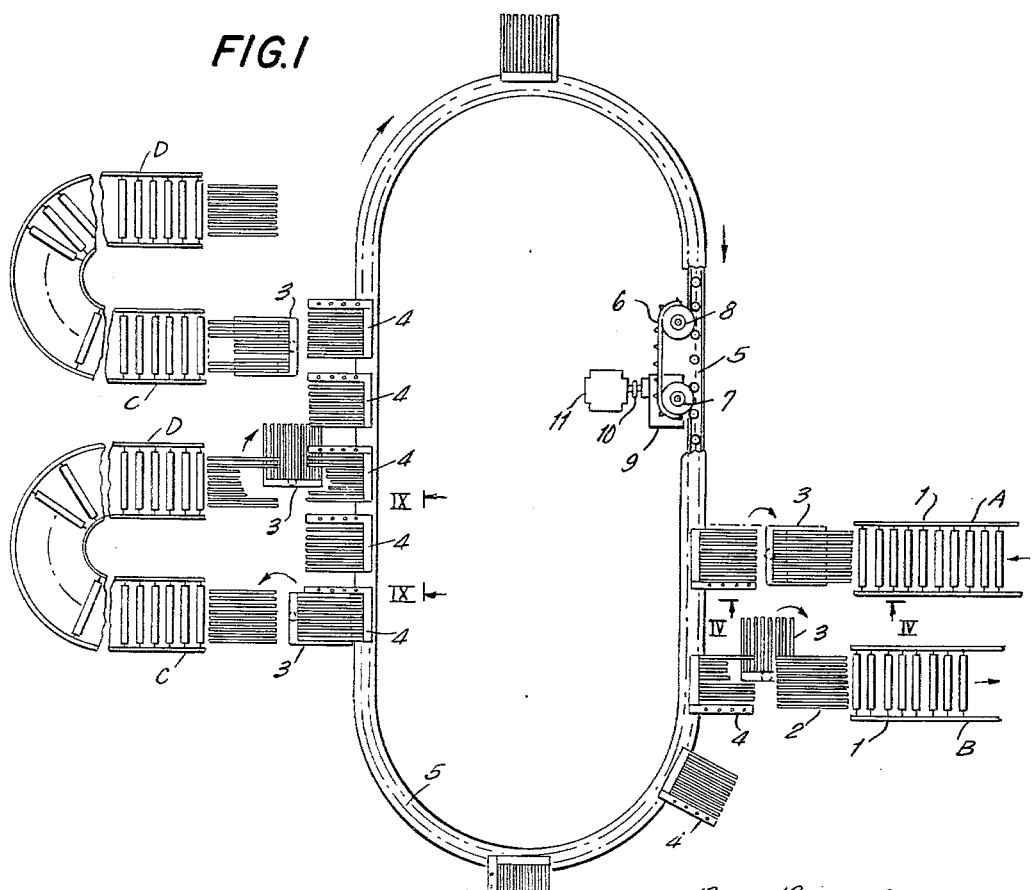
FIG.1
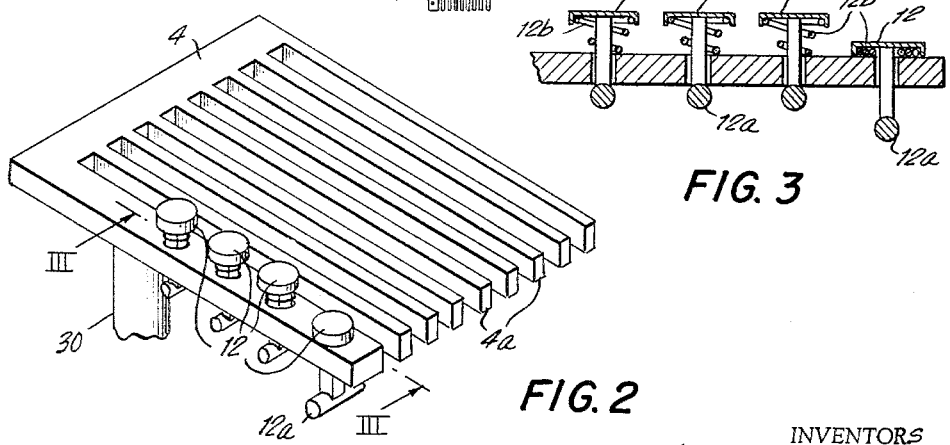
FIG. 2
FIG. 3
INVENTORS
JOSEPH MINICHELLO
FRANK MINICHELLO
BY VINCENT R. MINICHELLO
Briskin & Goldfarb
ATTORNEYS

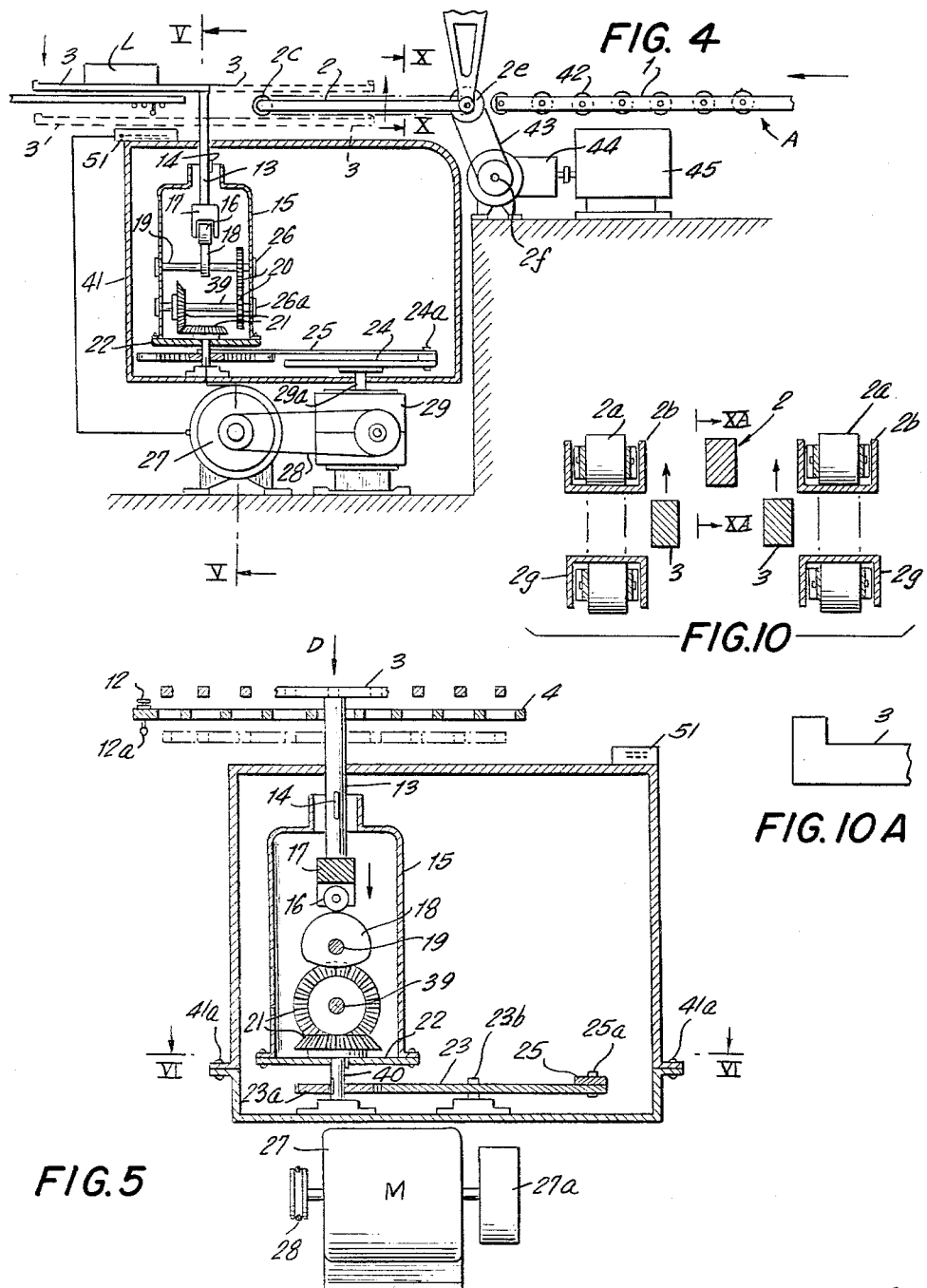

May 10, 1966  J. MINICHELLO ET AL  3,250,377
PACKAGE SORTING SYSTEM AND TRANSFER MECHANISM THEREFOR
Filed Dec. 11, 1963  3 Sheets-Sheet 3

INVENTORS
JOSEPH MINICHELLO
FRANK MINICHELLO
BY VINCENT R. MINICHELLO

ATTORNEYS

United States Patent Office 3,250,377
Patented May 10, 1966

3,250,377
PACKAGE SORTING SYSTEM AND TRANSFER
MECHANISM THEREFOR
Joseph Minichello, 19 Crest Road, North Merrick, Long Island, N.Y.; Frank Minichello, 2729 E. 22nd St., Brooklyn, N.Y.; and Vincent R. Minichello, 33 Manhattan Court, Brooklyn, N.Y.
Filed Dec. 11, 1963, Ser. No. 329,822
14 Claims. (Cl. 198—38)

This invention relates to a package sorting system and transfer mechanism adapted to automatically transport and distribute a series of loads from one or more sources to predetermined receiving stations. More particularly, the invention relates to a load transporting system and transfer assembly which can automatically receive a series of loads from one or more predetermined pick-up stations and deposit them at predetermined receiving stations having storage areas and located anywhere along the path of a conveyor. The system can then automatically retrieve loads which have been deposited at the storage areas and transport them to one or more order stations.

In merchandise warehouses, a plurality of different packages must be received from the receiving platform, delivered to storage areas according to the particular packages, and then must be sorted and assembled into orders before delivery to a central packaging department. Similarly, in post offices, mail is separated according to states and cities, and the hand-sorting of packages is a laborious operation. Furthermore, in mass production industries, automatic sorting, storage, selecting from storage, and distributing are necessary and often time-consuming operations preliminary to shipping.

The distribution of items and loads to storage areas and then retrieving them for order filling is, at present, a time-consuming and expensive operation, since it is carried out, for the most part, by hand. Although there are some mechanical means customarily employed to ease the burden of lifting and carrying, such as tow lines, fork-lift trucks, and gravity roller conveyors, most of the work requires the handling of the loads by hand labor and manual operation.

Belt conveyors and slat conveyors are known which employ a deflector for pushing packages off of a conveyor at a predetermined station. Also, Patent No. 3,034,665 of Speaker describes a system which uses an inclined tray to drop the package into a predetermined bin. However, these systems do not provide means for delivery of loads to specified storage and retrieving from storage to deliver the loads to predetermined areas.

It is therefore an object of the present invention to provide a transporting system which can take a package from a predetermined package area, transport the package to its own designated area in a warehouse for storage, then to reclaim this package upon order and deliver it to a central area to fill an order for various types of packages.

It is another object of the invention to provide a load transfer assembly which will automatically deliver a package to a support, lift the package and swing it around 180 degrees and then lower it onto a conveyor.

It is a further object of the invention to provide a transfer mechanism which will automatically lift a package from a pre-designated pallet on a conveyor, swing it 180 degrees in a horizontal plane, and lower it onto a support for conveying to a storage area.

Still another object of the invention is to provide a load transporting system with discriminating control means that can be set to deposit a package at a variably selected station.

Another object of the invention is to provide a load transporting system with discriminating control means that can be set to pick up a package at a variably selected station.

To these ends, and in accordance with the invention, a transfer assembly is provided which comprises basically three component mechanisms. The first mechanism, located at the pickup or delivery station, comprises a fixed slotted support which includes a plurality of spaced fingers formed as troughs or channels, and carrying endless short-pitch roller chains which may be driven so as to travel through the channels in either direction along a horizontal load-carrying path and to return the chain below the load-carrying path. The direction of travel of the roller chains would depend on whether a package is to be sent from the pickup station to warehouse storage or from storage to order picking. Steel slide bars with upturned end stops are spaced parallel to and between or after the chain-carrying troughs to form a fixed slotted support having load-stopping abutments.

The second of the basic component parts is a substantially horizontal slotted table having spaced load-supporting fingers and which is able to swing at least 180 degrees about a vertical axis, and capable of being raised and lowered. A drive provided with a cam mechanism, upon signal, raises the table so that its fingers pass interdigitatingly upwardly through the spaces between the above-described spaced chain and slide bar fingers of the fixed support in order to lift the package therefrom. The mechanism then rotates the table about its vertical axis 180 degrees, and lowers the load onto a conveyor-mounted pallet likewise having spaced fingers, the fingers of the swingable table interdigitatingly passing down between the fingers of the pallet on the conveyor.

The third basic part of the invention comprises the mentioned conveyor-chain mounted finger pallets which serve as slotted means for removing the loads from the vicinity of the table or delivering loads thereto. These pallets are connected to and carried by a chain travelling in a horizontal loop. The conveyor pallets are each carried on a pallet-support shaft mounted in a shaft support and provided with guide rollers and channels which not only guide the conveyor chain but keep the pallet-support shaft in a vertical predetermined plane and determine the level of the conveyor-carried pallet during horizontal movement of the conveyor chain.

Removal of a package from the spaced fingers of a specific conveyor pallet is the reverse of the above-described pickup operation, and is accomplished by means of the same or another rotatable and liftable transfer table with fingers which, upon signal, pass upwardly between the fingers of a pre-selected conveyor-carried pallet. The transfer table then rotates 180 degrees and its fingers drop down through spaces between a package-receiving set of fingers on a support at a receiving station having short-pitch roller chains similar to those above described, but designed to usually travel away from the pallet-carrying conveyor loop. A system of controls and manually operable keys mounted on the conveyor pallet and cooperating with switches, and if desired, signal-actuating means, at the various stations, makes it possible to select which station will be served for pick-up or for delivery by a particular pallet on the conveyor.

Other objects, features and many of the attendant advantages of this invention will be readily appreciated as the same becomes better understood by reference to the following detailed description when considered in connection with the accompanying drawings, wherein:

FIG. 1 is an overall plan view of a typical system according to the invention, showing pickup stations, a conveyor loop, storage stations, order stations, transfer tables, and other appertaining components of the system;

FIG. 2 is a perspective view showing a detail of a conveyor-carried pallet;

FIG. 3 is a cross section taken along lines III—III of FIG. 2;

FIG. 4 is a cross section taken along lines IV—IV of FIG. 1, except that the transfer table has been illustrated revolved in position 180 degrees from that of FIG. 1.

FIG. 5 is a cross section taken along lines V—V of FIG. 4;

FIG. 10 is a cross section taken along lines X—X of FIG. 4;

FIG. 10A is an enlarged side elevation of a portion of the table.

Figure 6:
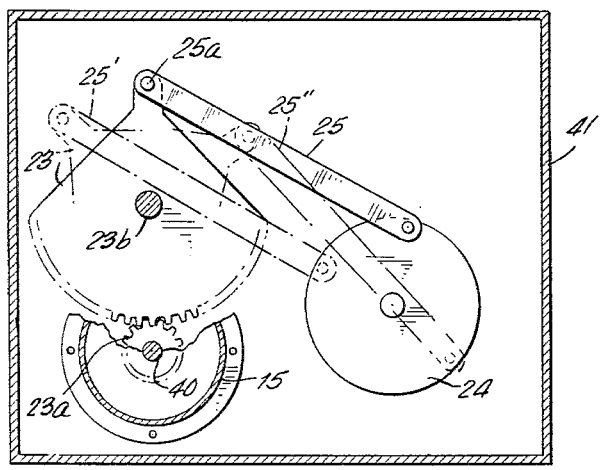
FIG. 6 is a cross section taken along lines VI—VI of FIG. 5.

In FIG. 1 is shown a general plan view of a system according to the invention. A conveyor chain 5 having mounted thereon pallets 4 provided with spaced fingers 4a (FIG. 2), travels in a horizontal path about a loop, which may be oval or of any desired shape, in order to reach a plurality of stations for either pickup or delivery of packages. Packages in the form of boxes, sacks, or various shaped loads L (FIG. 4) are introduced into the system, for example from a truck-unloading platform (not shown) where they are placed on a conventional live roller conveyor 1 at a pickup or collection station A (FIGS. 1, 4). Live rollers 42 (FIG. 4) mounted in the conveyor 1 are driven in a known manner. Level with and adjacent to the end of the live roller conveyor 1 is a support or finger platform comprising a plurality of troughs or channels 2b in which ride endless short-pitch roller chains 2a travelling in a substantially horizontal load-carrying path. Each of the load-supporting fingers of the platform formed by channels 2b has a chain sprocket 2c at its end over which the respective roller chains 2a return through channels 2g. A drive shaft 2e, common to all roller chains 2a of a respective finger platform, is driven from a conventional drive 2f, which includes a drive chain and sprockets 43, and a reduction gear 44 driven from a motor 45. In a known manner, the drive 43–44–45 may be reversed to make the roller chains 2a travel to the left or to the right relative to FIG. 4, depending on whether a package is to be sent toward the conveyor loop 5 or away therefrom. The live rollers 42 of roller conveyor 1 are likewise adapted to be driven in a corresponding direction.

The slotted transfer table 3 which transfer the packages between the just-described roller-chain fingers 2 to one of the conveyor pallets 4 will now be described. The load-supporting slotted table 3 comprises a plurality of spaced-apart cantilevered fingers which, as may be seen in FIG. 10, are so dimensioned and spaced the proper distance apart so that when the table 3 is properly positioned they can pass freely upwardly and downwardly through the spaces between the channels or steel slide bars 2b and return channels 2g of the slotted means 2. The fingers 3 form a slotted table which remains horizontal throughout its movements, but which is movable upwardly, downwardly, and which can rotate at least 180° about the vertical axis of a vertical shaft 13 upon which the slotted table 3 is mounted. The table 3 is supported on the vertical shaft 13 in a cantilevered manner, as best shown in FIGS. 4 and 5.

In order to rotate vertical shaft 13 about its own axis, it is keyed by a key 14 to a rotatable housing 15, which will be described presently. In order to provide upward and downward movement of shaft 13, and thus of table 3, the shaft 13 has mounted at its lower end a guide roller 16, rotatably carried by a bifurcated roller support 17 fixed to the bottom of vertical shaft 13. The guide roller 16 acts a cam follower, and rides upon a cam 18, fixed to a horizontal cam shaft 19 journalled in bearings 26 in the housing 15. In the position of FIG. 5, the cam 18 is shown in its highest position where it has raised shaft 13 and thus table 3 to its maximum operative height sufficient to adequately clear roller chains 2 and pallets 4. The cam shaft 19 is driven through a pair of spur gears 20, one of which is fixedly mounted on cam shaft 19, and the other of which is mounted on a gear shaft 39 located below and parallel to cam shaft 19 and journalled in bearings 26a in housing 15. Also fixedly mounted on gear shaft 39 is one of a pair of bevel gears 21. The other of the pair of bevel gears 21 is fixedly mounted on a vertical shaft 40 which passes through and is keyed to the base plate 22 of housing 15 for rotation of housing 15 together with gear 21. Beneath the base plate 22, a pinion 23a is also keyed to the shaft 40, for imparting rotary motion to shaft 40 and thus to housing 15 and simultaneously to bevel gear pair 21.

The lower gear of the bevel gear pair 21 is fixedly mounted on the base plate 22 of the bell housing 15. As best shown in FIG. 6, the pinion 23a meshes with a gear segment 23 which is rockingly swingable about a pivot shaft 23b. Rocking motion is imparted to gear segment 23 by means of a linking lever 25 pivoted to gear segment 23 at 25a and pivoted to a driver wheel 24 at 24a. The pinion 23a during operation must oscillate 180 degrees. Consequently, corresponding to the travel between the extreme positions 25' and 25" of the linking member 25, the length of the working arc of the meshing gears of gear segment 23 will be equal to one half of the circumference of the pinion 23a. The horizontal drive wheel is rotatably driven by means of a motor 27 through chain and sprocket drive 28 (FIG. 4), connected to a worm reduction gear 29 having an output shaft 29a fixed to the drive wheel 24.

The rotatable bell housing 15 is fixedly connected, for example by bolts, to the bell housing plate 22. The bell housing supports the bearings 26 and 26a, which in turn respectively support the cam shaft 19 and the gear shaft 39. The motor 27 is provided with a brake 27a of conventional type to instantly stop the motor 27 upon opening of its circuit, thus arresting the table 3 in an instantaneous desired position. An outer housing 41 is provided for enclosing the transfer table driving parts located between shafts 29a and slotted table 3. The housing 41 is preferably made as a split box, bolted together at 41a for ease of assembly.

Figure 7:
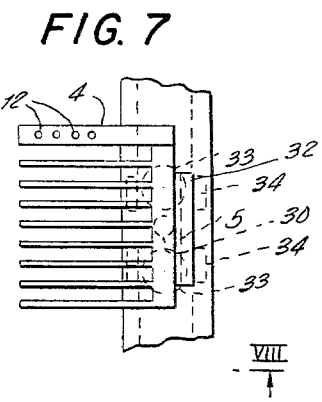
FIG. 7 is a detail, in plan view, of a conveyor pallet, taken along lines VII—VII of FIG. 9.
Figure 8:
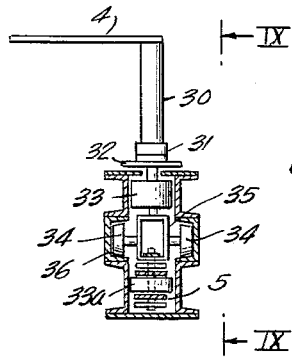
FIG. 8 is a vertical section taken along lines VIII—VIII of FIGS. 7 and 9.
Figure 9:
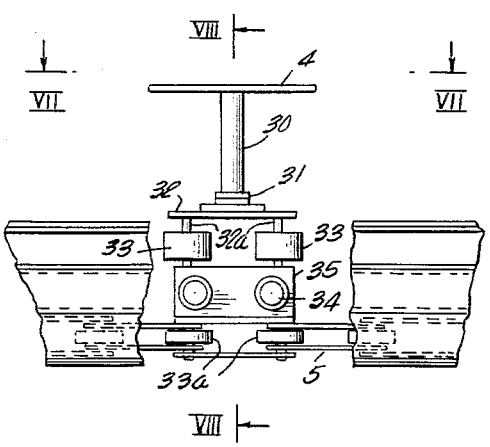
FIG. 9 is an enlarged side elevation of a portion of the conveyor loop of FIG. 1, looking outwardly from the inside of the conveyor loop in the direction IX—IX of FIG. 1.

As shown in FIGS. 7, 8 and 9, the conveyor 5 which carries the pallets 4 at spaced intervals comprises an endless link roller chain which travels in a predetermined loop (FIG. 1). Each of the slotted pallets 4 is mounted on its own vertical shaft 30, which is carried in a shaft support 31 bolted to a bearing plate 32. The bearing plate 31 is connected by means of bolts 32a to a rectangular support box 35, which in turn is bolted to a respective link of the conveyor chain 5. Four tapered rollers 34 are mounted on each support box 35 for guiding it. The rollers 34 roll in guide channels 36 so as to guide the chain 5 and also to keep it at a predetermined elevation. Mounted above the box 35 on the respective bolts 32a are rollers 33 whose axes are vertical. The rollers 33, 34 and the guide rollers 33a of the conveyor chain 5 serve to keep the axis of the pallet supporting shaft 30 vertical during hoizontal movement of the chain 5 around its loop.

The chain-mounted slotted pallets 4 are thus moved by the conveyor chain 5, which in turn is driven by a conventional conveyor drive. The conveyor drive (FIG. 1) comprises a drive chain 6 provided with dogs which engage the links of chain 5 between the rollers 33a. The drive chain 6 is an endless chain passing over drive sprocket 7 and drive take-up sprocket 8. The drive sprocket 7 is driven by a motor 11, which is connected by a coupling 10 to a worm gear reducer 9.

The controls for the above system will now be described. The motor 27 which operates the slotted transfer table 3 is actuated by means of a reed switch 51. A separate switch 51 is mounted on the upper surface of the housing 41 of each transfer table 3, in a location such that it will cooperate with only one of a group of aligned actuators 12, 12a located on each pallet 4. As best illustrated in FIGS. 3 and 4, each of the chain-mounted slotted pallets 4 has mounted thereon a plurality of rod-shaped permanent magnets 12a, mutually aligned in a direction perpendicular to the path of the travel of the conveyor chain 5. The number of magnets 12a on each pallet will be at least equal to the number of separate reed switches 51, one at each transfer table 3, to be selectively actuated by that pallet. The rod magnets 12a are attached to depressable keys 12. As best shown in FIG. 3, the keys 12 comprise a recessed button into which a helical spring 12b fits so as to retain the key 12 and its magnet 12a in lowered position, due to friction of the helical spring upon itself when the button 12 is depressed. A respective rod magnet 12a can be raised from its actuating lowered position merely by manually exerting a lifting force on the lowered button 12, which causes the respective spring 12b to urge its button 12 back into raised position. The rod magnets 12a are normally in raised position and are depressed by an operator or dispatcher. The lower end of each helical spring 12a is welded to the upper surface of slotted pallet 4.

Th reed switches 51 are normally open, and close when a respective one of the rod magnets 12a, in lowered condition, passes directly over a switch 51 in sufficient proximity to cause the contacts of the reed switch to come together, thus closing the circuit to the motor 27, which will cause an operating cycle to take place in the transfer table 3.

The motor coil of each motor 27 at a respective transfer table 3 is connected in series with the corresponding reed switch 51. A conventional time delay control will start the motor 27 either instantly or with a delay anywhere up to 120 seconds, the delay being adjustable to make the fingers of swingable slotted transfer table 3 pass through the spaces between the chain-mounted pallets 4 just at the right time while the conveyor 5 is moving. The delay is set to operate the motor 27 for the time duration required for exactly one revolution of wheel 24, then open the circuit and actuate the solenoid brake. This cycle is repeated every time a respective rod magnet 12a closes a reed switch 51.

The motor 11 which drives the conveyor chain 5, and the motor 45 which drives the roller chains 2, 2a, each operate continuously, and the only controls necessary for these motors are on-off switches.

Operation of the system according to the invention is as follows:

The buttons or keys 12 on each of the conveyor pallets 4 are normally in the up position. The dispatcher will depress one of the keys 12 on a respective pallet 4. For purposes of illustration, the right-hand key 12 and its corresponding rod magnet 12a are shown in depressed position in FIGS. 2 and 3. The other rod magnets 12a remaining in raised position will have no effect on any of the reed switches 51 along their travel path as conveyor 5 moves pallets 4 around the loop. Furthermore, a lowered particular rod magnet 12a will not have any influence on the reed switches 51 which are not positioned directly below the travel path of that particular rod magnet. Consequently, the rod magnet 12a of a particular key 12 will actuate the reed switch 51 of only one or more particularly designated stations where the reed switches are identically located. When the particular reed switch 51 is closed, the corresponding motor 27 will be actuated to turn the wheel 24 of that station exactly one revolution, rocking the segment gear 23 by moving linkage 25 from its position 25″ to position 25′ (or vice-versa, depending upon the desired direction of rotation of table 3). A package L which has been delivered to the end of roller conveyor 2 is retained by the abutments at the end of slide bars 2b, and is lifted from the spaced fingers 2 by the upward motion of slotted transfer table 3, which then rotates 180 degrees and drops down at the exact proper instant between the spaced fingers 4a of the particular pallet 4 which was designated by the dispatcher for receiving this package L when he depressed the corresponding button 12. The spaced fingers of the table 3 pass down through the spaced fingers 4a of the pallet, causing the load L to be deposited onto the pallet 4. The transfer table 3 drops below the horizontal travel path of the pallet 4. The pallet 4 continues around the horizontal loop of conveyor 5 until the depressed rod magnet 12a actuates another reed switch 51 at a designated storage area station. At this station, for example station C (FIG. 1), another transfer table 3 is actuated through a cycle by a reed switch 51 closing due to the proximity of the depressed magnet 12a passing directly over it. At the right time, the slotted transfer table 3 at station C moves upward through the fingers of the particular pallet 4, lifts the load L, rotates 180 degrees until it is aligned with a corresponding roller-chain receiving table 2, and the transfer table 3 then drops down through in the spaces between the roller-chain fingers, depositing the packages thereon. The roller-chains 2 at the station C operate in a direction away from the conveyor 5 and deposit the load on gravity rollers arranged in a U-shaped loop for storage. The packages are subsequently fed from storage back to a pick-up station D located on the other side D of the U-shaped storage loop C–D. From the station D, a package can be removed from storage by a transfer table 3 and transferred back on to a designated pallet 4 of the conveyor 5 when the dispatcher depresses a selected one of the buttons 12. Different packages from their own respective storage areas can all then be deposited at an order-picking station B for shipping.

Thus it may be seen that the system according to the invention permits the dispatcher, merely by depressing a designated button 12 on a particular pallet 4, to control the system so that it can automatically receive a series of loads L from one or more predetermined pickup stations A, D and deposit them at predetermined receiving stations C having storage areas located anywhere along the path of the conveyor 5. The system can then automatically retrieve loads L which have been deposited at the storage areas C, picking them up at D, and transport them to one or more order stations B.

The control systems operable by buttons 12 and by magnetic reed switches 51 illustrate only one embodiment of an operable control system. Those skilled in the conveyor art, upon reading the above disclosure, will recognize that other control systems are obvious in the light of the above teachings. For example, cam-operated limit switches or micro switches located along the path of the conveyor 5 may be utilized to operate motors 27. Furthermore, instead of depressing the buttons 12 by hand, glide rails or equivalent means can be provided for depressing these buttons 12 as they pass underneath a button-depressor device in which predepressed rails guide the respective buttons into depressed positions, the button depressor device thus serving as a memory device.

It should be understood, of course, that the foregoing disclosure relates to only preferred embodiments of the invention, and that it is intended to cover all changes and modifications of the examples of the invention herein chosen for the purpose of the disclosure, which do not constitute departures from the spirit scope of the invention as set forth in the appended claims.

We claim:

1. A transfer assembly for a package handling and sorting system comprising a table having spaced parallel fingers, first slotted means for delivering a load to the vicinity of said table, second slotted means for removing said load from the vicinity of said table, said fingers being interdigitatingly passable through said first and second slotted means for transferring loads to and from said table, drive means for sequentially lifting, rotating and lowering said table in one continuous movement, and control means for actuating said drive means.

2. A transfer assembly for a package handling and sorting system comprising a table having spaced parallel fingers, first slotted means for delivering a load to the vicinity of said table, second slotted means for removing said load from the vicinity of said table, said fingers interdigitatingly passing through said first and second slotted means for transferring loads to and from said table, drive means for lifting, rotating and lowering said table through a predetermined cycle in one continuous movement, and control means for actuating said drive means.

3. A transfer assembly according to claim 2, one of said first and second slotted means comprising a fixed slotted support having spaced parallel slide bars, abutment means on said bars for arresting a load on said bars, the other of said first and second slotted means comprising a plurality of interconnected sequentially arranged slotted pallets provided with spaced parallel fingers.

4. A transfer assembly according to claim 2, one of said first and second slotted means including a plurality of substantially horizontal spaced parallel troughs, and roller chain means within said troughs for carrying a load to the vicinity of said table.

5. A transfer assembly according to claim 2, one of said first and second slotted means including a plurality of substantially horizontal spaced parallel troughs, and roller chain means within said troughs for carrying a load away from the vicinity of said table.

6. A transfer assembly for a package handling and sorting system comprising a table having spaced parallel fingers, first slotted means for delivering a load to the vicinity of said table, second slotted means for removing said load from the vicinity of said table, said fingers interdigitatingly passing through said first and second slotted means for transferring loads to and from said table, drive means for lifting, rotating and lowering said table, and control means for actuating said drive means, said table comprising a vertical shaft, a slotted platform mounted in cantilevered manner on said shaft, said drive means including cam means for moving said shaft in a vertical direction, a housing fixed to said shaft and rotatable therewith, a motor, and gear means interconnecting said motor with said cam means and with said housing.

7. A transfer assembly according to claim 6, said gear means including a gear segment having a pivot, linking means between said motor and said gear segment for cyclically rocking said gear segment about said pivot, and a gear fixedly associated with said housing and meshing with said gear segment for rotating said housing and thus said vertical shaft and said table about the axis of said vertical shaft in synchronization with the rocking cycle of said gear segment.

8. A package handling and sorting system comprising conveyor means having a plurality of interconnected sequentially arranged slotted pallets provided with spaced parallel fingers, a transfer mechanism comprising a table having spaced parallel fingers interdigitatingly passable through the fingers of a respective one of said pallets in a given position of the latter, drive means for lifting, rotating and lowering said table through a predetermined cycle in one continuous movement, and control means for actuating said drive means.

9. A package handling and sorting system comprising conveyor means having a plurality of sequentially arranged slotted pallets provided with spaced parallel fingers, an endless conveyor chain interconnecting said pallets, each of said pallets being provided with support means connecting same to said chain, roller means for guiding said chain, conveyor drive means for driving said chain along a predetermined path, a transfer mechanism comprising a table having spaced parallel fingers interdigitatingly passable through the fingers of a respective one of said pallets in given respective positions of said table and of said one pallet, drive means for lifting, rotating and lowering said table through a predetermined cycle in one continuous movement, and control means for actuating said drive means.

10. A package handling and sorting system comprising conveyor means having a plurality of sequentially arranged slotted pallets provided with spaced parallel fingers, an endless conveyor chain interconnecting said pallets, each of said pallets being provided with support means connecting same to said chain, roller means for guiding said chain, conveyor drive means for driving said chain along a predetermined path, a transfer mechanism comprising a table having spaced parallel fingers interdigitatingly passable through the fingers of a respective one of said pallets in given respective positions of said table and of said one pallet, drive means for lifting, rotating and lowering said table through a predetermined cycle in one continuous movement, and control means for actuating said drive means, said fingers of respective ones of said slotted pallets extending horizontally in a direction generally perpendicular to the travel path of said conveyor chain.

11. A package handling and sorting system comprising conveyor means having a plurality of interconnected sequentially arranged slotted pallets provided with spaced parallel fingers, a transfer mechanism comprising a table having spaced parallel fingers interdigitatingly passable through the fingers of a respective one of said pallets in a given position of said table and of said one pallet, drive means for lifting, rotating and lowering said table through a given cycle, and control means for actuating said drive means, said control means comprising selective switch actuating means mounted on at least said one pallet for travel therewith along a given path, switch means mounted along said given path in the vicinity of said transfer mechanism, and means operably connecting said switch means with said drive means for actuating the latter to perform one of said cycles.

12. A package handling and sorting system comprising conveyor means having a plurality of interconnected sequentially arranged slotted pallets provided with spaced parallel fingers and having a vertical axis movable along a common predetermined horizontal path, a plurality of transfer mechanisms arranged alongside said path, each of said mechanisms comprising a table having spaced parallel fingers interdigitatingly passable through the fingers of a respective one of said pallets in a given position of said table and of said one pallet, drive means for lifting, rotating and lowering said table, and discriminating control means for actuating said drive means.

13. A package handling and sorting system comprising conveyor means having a plurality of interconnected sequentially arranged slotted pallets provided with spaced parallel fingers and having a vertical axis movable along a common predetermined horizontal path, a plurality of transfer mechanisms arranged alongside said path, each of said mechanisms comprising a table having spaced parallel fingers interdigitatingly passable through the fingers of a respective one of said pallets in a given position of said table and of said one pallet, drive means for lifting, rotating and lowering said table, and discriminating control means for actuating said drive means, said discriminating control means including depressable magnets arranged on each of said pallets for travel therewith along magnet travel paths parallel to said predetermined path of said pallet axes, and switch means responsive to proximity of a depressed one of said magnets for actuating the drive means of a respective one of said transfer mechanisms.

14. Apparatus according to claim 13, said switch means comprising a plurality of reed switches each located on a respective one of said magnet travel paths.

References Cited by the Examiner
UNITED STATES PATENTS

| | | | |
|---|---|---|---|
| 1,423,765 | 7/1922 | Hastings | 198—156 |
| 2,758,698 | 8/1956 | Freeman | 198—38 |
| 2,838,186 | 6/1958 | Alimanestiano. | |

SAMUEL F. COLEMAN, *Primary Examiner.*

RICHARD E. AEGERTER, *Examiner.*